US012194656B2

(12) United States Patent
Martinez et al.

(10) Patent No.: US 12,194,656 B2
(45) Date of Patent: Jan. 14, 2025

(54) METHOD FOR MANUFACTURING A CAP FOR PLUGGING A BOTTLE COMPRISING CORK SHEETS GLUED ON THE TWO LIDS AND ON THE ROLL

(71) Applicant: DIAM BOUCHAGE, Ceret (FR)

(72) Inventors: Sophie Martinez, Ceret (FR); Rébecca Zettwoog, Perpignan (FR); Christophe Loisel, Villeneuve De La Raho (FR)

(73) Assignee: DIAM BOUCHAGE, Ceret (FR)

( * ) Notice: Subject to any disclaimer, the term of this patent is extended or adjusted under 35 U.S.C. 154(b) by 0 days.

(21) Appl. No.: 18/342,563

(22) Filed: Jun. 27, 2023

(65) Prior Publication Data

US 2024/0001583 A1 Jan. 4, 2024

(51) Int. Cl.
*B27J 5/00* (2006.01)
*B65D 39/00* (2006.01)

(52) U.S. Cl.
CPC ............ *B27J 5/00* (2013.01); *B65D 39/0011* (2013.01)

(58) Field of Classification Search
CPC ............................... B27J 5/00; B65D 39/0011
See application file for complete search history.

(56) References Cited

FOREIGN PATENT DOCUMENTS

ES 2288387 A1 * 1/2008
FR 2832950 11/2001
WO WO-01/25103 A1 * 4/2001
WO WO2008/113608 A2 9/2008
WO WO2008/113608 A3 9/2008

OTHER PUBLICATIONS

Communication for EP 22 30 5948, mailed Jan. 3, 2023 (9 pages) no English translation available.

* cited by examiner

*Primary Examiner* — Jeffry H Aftergut
(74) *Attorney, Agent, or Firm* — Christensen O'Connor Johnson Kindness PLLC

(57) ABSTRACT

A method for manufacturing a cap for plugging a bottle so as to be able to be forcibly inserted into the neck of the bottle, comprising the following steps:

cutting cork sheets to be glued on the lids and on the roll of the cap, gluing one of said cork sheets on the roll of the semi-finished cap with a reduced diameter by depositing a binder suitable for food contact, followed by baking, and gluing each of the other cork sheets on each lid of the semi-finished cap with a reduced diameter by depositing a binder suitable for food contact, followed by baking, the semi-finished cap with a reduced diameter being a cap made of crushed cork glued under pressure with a polyurethane binder, having a diameter uniformly reduced by a thickness equal to twice the thickness of a cork sheet glued on the roll.

14 Claims, 5 Drawing Sheets

[Fig 1]
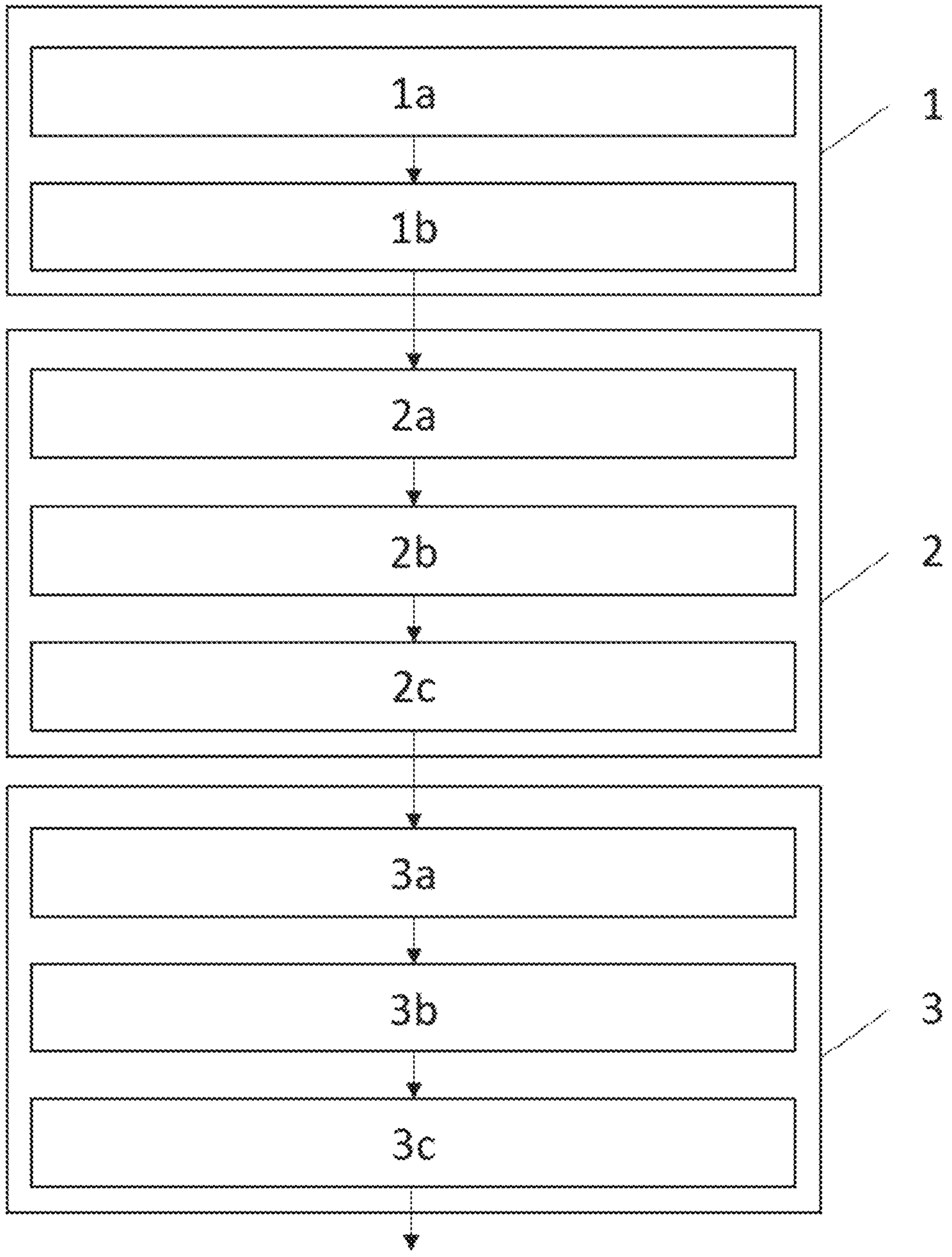

[Fig 2]
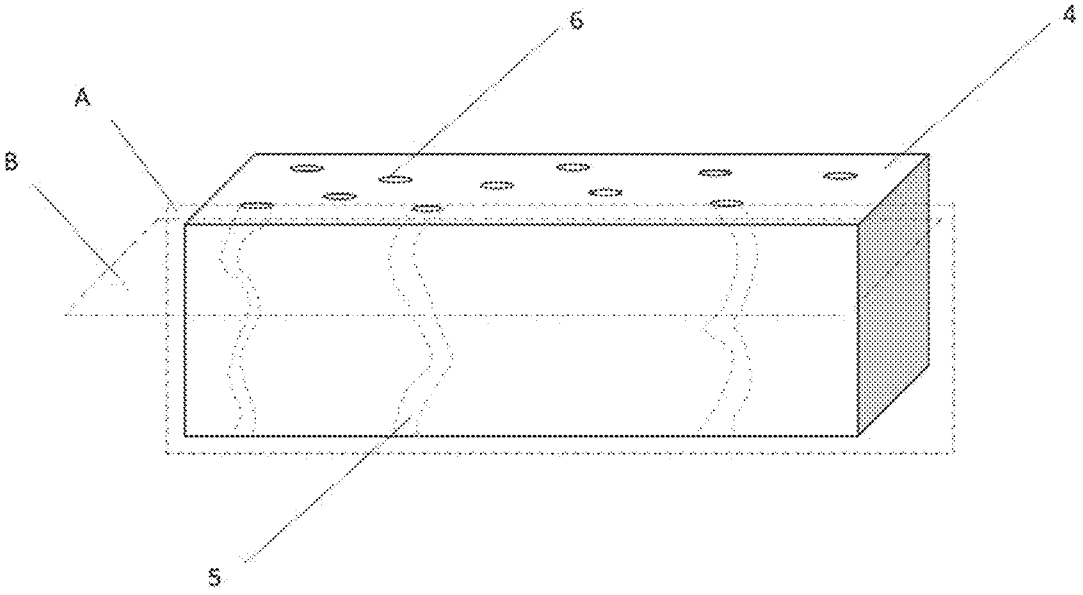
[Fig 3]
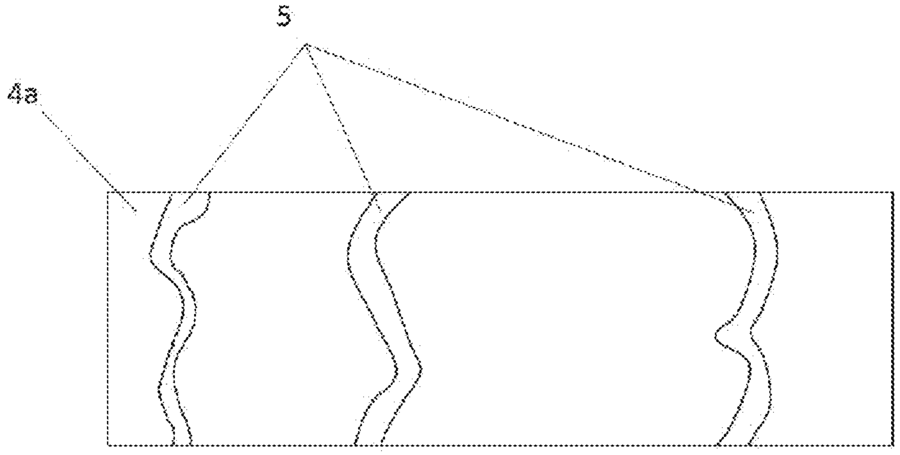

[Fig 4]
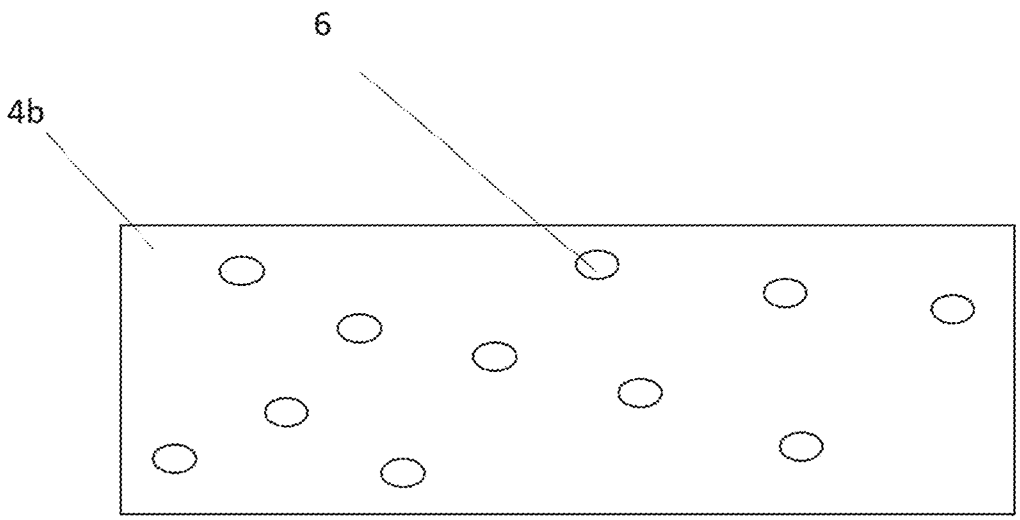
[Fig 5]
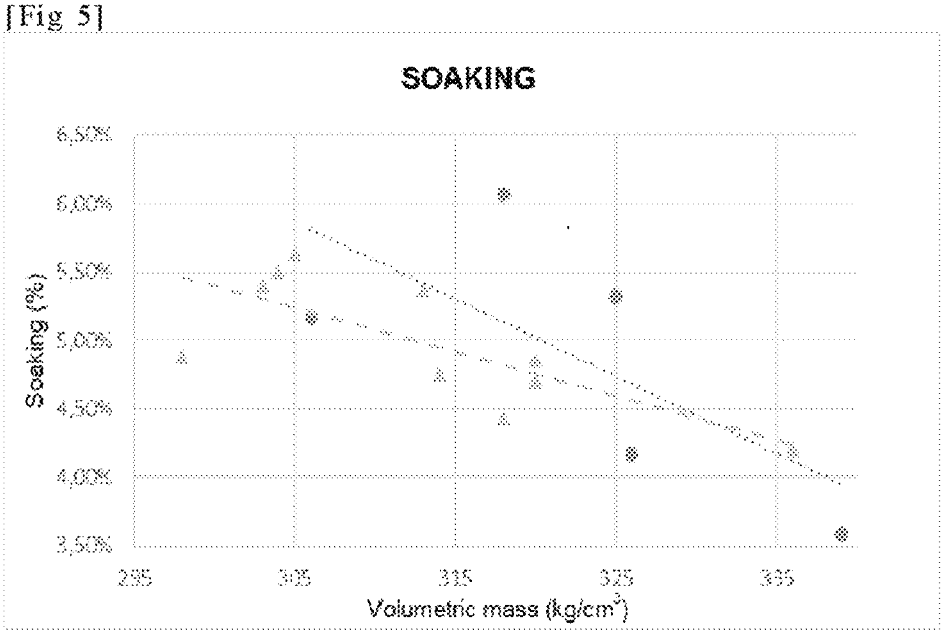

[Fig 6]
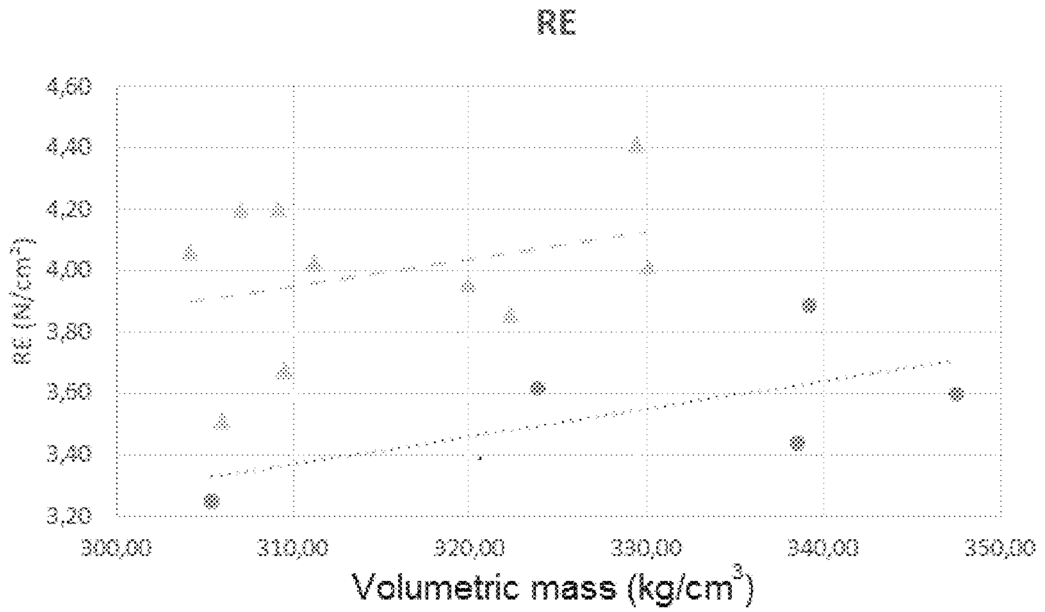
[Fig 7]
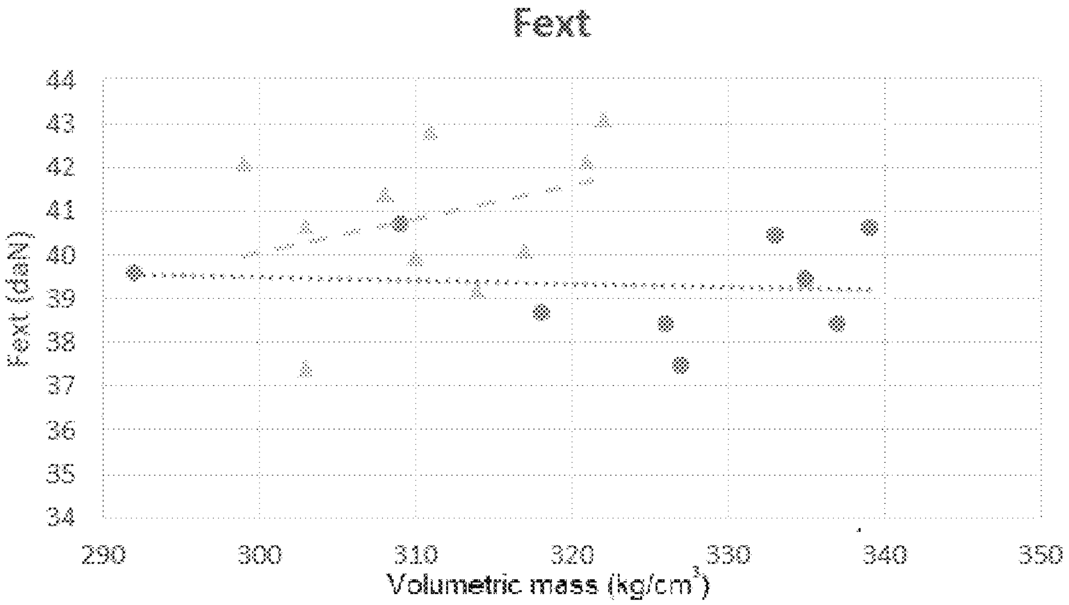

[Fig 8]
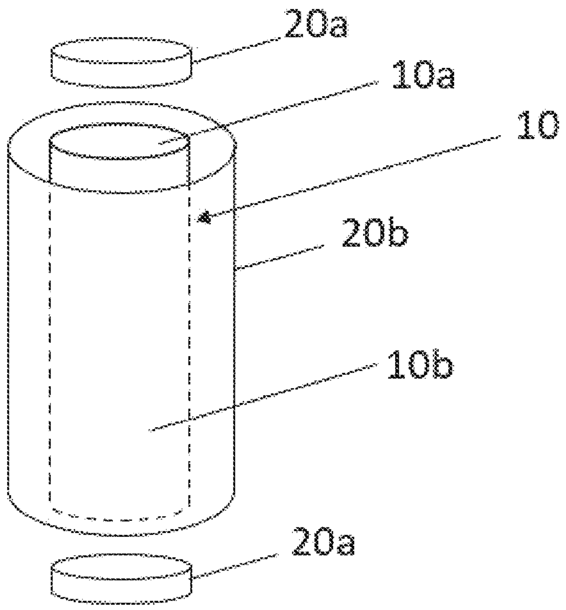

METHOD FOR MANUFACTURING A CAP FOR PLUGGING A BOTTLE COMPRISING CORK SHEETS GLUED ON THE TWO LIDS AND ON THE ROLL

CROSS-REFERENCES TO RELATED APPLICATIONS

This application claims the benefit of EP 22305948.6, filed Jun. 29, 2022, the disclosure of which is incorporated by reference in its entirety.

TECHNICAL FIELD

The technical field of the invention relates to cork caps, and more particularly, such caps reconstituted based on cork elements.

PRIOR ART

Cork is a natural material, impermeable and light, which is derived from the bark of some oak species, such as cork oak, which are typically found in countries bordering the Mediterranean, in Europe and in North Africa.

Cork has been used in particular in the manufacture of caps, which are used to plug containers such as bottles containing liquids intended for consumption, in particular, still or sparkling wine, spirits or other beverages. Caps are produced either by tubing cork boards, or by reconstitution using shredded and sieved cork with polymers.

Cork is a material that is elastic, resilient, compressible, liquid-impermeable and having a high friction coefficient. Its structure offers permeability to gases enabling the exchange of oxygen useful for the maturation of the bottled product. Nonetheless, while its aesthetics are much appreciated, the structure of caps made of cork by tubing is quite variable resulting in a variability of this oxygen passage.

Conversely, the reconstituted caps, so-called agglomerated or micro-agglomerated, produced from crushed cork granulates, have a much more homogeneous structure.

Such agglomerated or micro-agglomerated caps are manufactured in several successive steps during which a blank cap is obtained upon the completion of the step of cross-linking the binder between the cork pieces. Afterwards, these blank caps are machined in order to confer thereon the required diameter and length. So-called semi-finished caps are then obtained.

These caps then undergo different steps, more or less optional, in order to make them compliant with a commercialised and ready for bottling cap. The caps are then so-called finished caps.

The reconstituted caps, so-called agglomerated or micro-agglomerated, have the major drawback, in aesthetic terms, of deviating from the conventional appearance of so-called "natural" caps tubed directly in the cork board. In return, they offer much better permeability characteristics, beneficial for wine ageing, as well as the possibility of treating the cork so as to reduce the presence of TCA (acronym of "2,4,6 trichloroanisole") to traces. It should be recalled that TCA s at the origin of a modification of the wine taste through the apparition of a so-called cap taste.

Nevertheless, this deviation from the conventional appearance of natural caps is at the origin of an a priori of both consumers and winemakers, and that being so even though progresses have been made in terms of appearance of these caps. For example, mention may be made of laser serigraphs which replicate the aspect of the pores and lenticels visible in natural caps. Nonetheless, these progresses are still not enough so that the consumers and winemakers are still capable of differentiating the agglomerated or micro-agglomerated caps from so-called "natural" caps.

Different documents have been published in an attempt to solve both the a priori of some users or consumers and the use of cork portion whose size or appearance do not allow extracting a cap made of natural cork.

Each document brings in a technical solution to the use of a cork portion by attempting to approach the closest possible the visual appearance of a conventional natural cap.

Amongst these solutions, mention may be made of so-called 1+1 caps made of cork whose opposite end faces (commonly called "lids") are made up of cork rings and the central body of agglomerated cork granules.

Thus, the lids of the reconstituted cap are masked by the cork rings both aesthetically and mechanically.

In such a 1+1 cap, the lateral force of the cap (commonly called "roll"), in contact with the bottle, is not modified. The user and the consumer can then identify the nature of the cap, which is at the origin of a prejudice and, for some persons, a rejection.

To date, it has been commonly believed that it was not possible to modify the roll of a reconstituted cap, because of the forces acting both during bottling and extraction of the cap. More specifically, it has been considered that these forces would cause a separation of the glued cork sheet. Nevertheless, such a lateral gluing is necessary to make the caps, whether of the natural type or reconstituted, look quite alike, in order to overcome the prejudices related to technical caps.

A technical problem to be solved is how to manufacture a cap for plugging a bottle in which the lids and the roll are covered with a natural cork layer, and which withstands bottling and decapping.

DISCLOSURE OF THE INVENTION

An object of the invention is a method for manufacturing a cap for plugging a bottle comprising two lids and a roll so as to be able to be forcibly inserted into the neck of the bottle, comprising the following steps:

- cutting cork sheets to be glued on the lids and on the roll of a semi-finished cap with a reduced diameter,
- gluing one of said cork sheets on the roll of a semi-finished cap with a reduced diameter by depositing a binder suitable for food contact, followed by baking, and
- gluing each of the other cork sheets on each lid of the semi-finished cap with a reduced diameter by depositing a binder suitable for food contact, followed by baking, the semi-finished cap with a reduced diameter being a cap made of crushed cork glued under pressure with a polyurethane binder, having a diameter uniformly reduced by a thickness equal to twice the thickness of a cork sheet glued on the roll.

The cork sheets glued on the roll of the cap may be cut in cork according to a direction perpendicular to the lenticels.

The cork sheets glued on the lids of the cap may be cut in cork according to a direction parallel or perpendicular to the lenticels.

The cork sheets may be treated so as to have a trichloroanisole level lower than 0.3 ng/l, preferably by a supercritical carbon dioxide treatment.

The semi-finished cap with a reduced diameter may be ground and/or trimmed after gluing a cork sheet to adapt the dimensions of the glued cork sheet to the dimensions of a semi-finished cap having undergone no diameter reduction.

The binder may be a mono-component polyurethane, a bi-component polyurethane or a hot-melt polyurethane.

Water may be applied before, during, or after the application of binder in order to accelerate cross-linking of the binder.

The baking may be carried out at a temperature comprised between 80° C. and 150° C. for a duration comprised between 10 min and 1 h 30 for a polyurethane binder.

The baking may be carried out in an autoclave or a tunnel oven.

The semi-finished cap with a reduced diameter with a glued cork sheet may be disposed in a mould allowing applying a pressure according to a direction normal to the surface of the cork sheet, the mould being preheated to the baking temperature.

To prepare a semi-finished cap with a reduced diameter, it is possible to machine a semi-finished cap so as to uniformly reduce its diameter by a thickness equal to twice the thickness of a cork sheet glued on the roll.

To prepare a semi-finished cap with a reduced diameter, it is possible to form a blank cap with a reduced diameter in a mould with a diameter uniformly reduced by a thickness equal to twice the thickness of a cork sheet glued on the roll corresponding to the diameter of a semi-finished cap with a reduced diameter, then the blank cap with a reduced diameter is machined so as to obtain a semi-finished cap with a reduced diameter.

A cork sheet glued on the roll may have a thickness comprised between 0.3 mm and 1 mm.

A cork sheet glued on a lid may have a thickness comprised between 0.3 mm and 2 mm.

Another object of the invention is a cap for plugging a bottle comprising two lids and a roll so as to be able to be forcibly inserted into the neck of the bottle, comprising:

- a semi-finished cap with a reduced diameter comprising two lids and a roll,
- a cork sheet glued on each of the lids and the roll of the semi-finished cap with a reduced diameter, the semi-finished cap with a reduced diameter being a cap made of crushed cork glued under pressure with a polyurethane binder, having a diameter uniformly reduced by a thickness equal to twice the thickness of a cork sheet glued on the roll.

BRIEF DESCRIPTION OF THE DRAWINGS

Other aims, features and advantages of the invention will appear upon reading the following description, given solely as a non-limiting example and made with reference to the appended drawings wherein:

FIG. 1 illustrates the main steps of a manufacturing method according to the invention, FIGS. 2 to 4 illustrate the direction of cutting the cork sheets in a cork parallelepiped, FIG. 5 illustrates the results of soaking tests of caps according to the invention and of reference caps, FIG. 6 illustrates the results of elastic return tests of caps according to the invention and of reference caps, FIG. 7 illustrates the results of extraction force tests of caps according to the invention and of reference caps, and FIG. 8 illustrates the main elements of a cap according to the invention.

DETAILED DESCRIPTION

The method for manufacturing a cap according to the invention is illustrated in FIG. 1. The cap manufactured by the manufacturing method comprises a lateral face, called roll, and two end faces, called lids.

During a first substep 1*a* of the first step 1, a semi-finished cap with a reduced diameter is prepared starting from a cap made of crushed cork glued under pressure with a polyurethane binder. By finished cap, it should be understood a cap ready for bottling. The patent application FR2672002 in the name of the Applicant illustrates such a cap. Only finishing steps separate a semi-finished cap from a finished cap. The diameter of the semi-finished cap is reduced by a thickness equal to twice a predetermined thickness. Such a diameter reduction is important in order to ensure that the cap produced by the manufacturing method, after finishing, has a diameter allowing ensuring that the extraction force will be lower than the 50 daN limit. The semi-finished cap with a reduced diameter comprises a lateral face and two end faces.

In a first embodiment, a semi-finished is machined so as to uniformly reduce its diameter by a thickness equal to twice the predetermined thickness.

In a second embodiment, a blank cap is formed in a mould having an inner diameter equal to the diameter of a semi-finished cap reduced by a thickness equal to twice the predetermined thickness. Afterwards, the obtained blank cap with a reduced diameter is machined in a manner similar to machining a blank cap, in accordance with the practices of the industry. A semi-finished cap with a reduced diameter similar to that one obtained by the first embodiment is obtained.

During a second substep 1*b* of the first step 1, cork leaves with a thickness comprised between 0.3 mm and 2 mm are cut in a cork parallelepiped having a shape suited for gluing them on the end faces and the lateral face of the semi-finished cap. The predetermined thickness is defined as being equal to the thickness of a cork sheet glued on the lateral surface of the semi-finished cap with a reduced diameter.

In a particular embodiment, the cork leaves glued on the end faces of the semi-finished cap with a reduced diameter are cut in cork according to a direction parallel to the lenticels. The lenticels are defined as the veins opening onto the pores of the cork bark. The cork leaf glued on the lateral face of the semi-finished cap with a reduced diameter is cut in cork according to a direction perpendicular to the lenticels.

FIG. 2 illustrates a natural cork parallelepiped bearing the reference numeral 4 comprising lenticels 5 opening onto pores 6. The cutting plane A is defined parallel to the lenticels and the cutting plane B is defined perpendicular to the lenticels.

FIG. 3 illustrates the surface of a first type 4*a* of cork leaves cut according to the plane A, parallel to the lenticels. It should be noted that lenticels or fragments of lenticels are found visible at the surface of a leaf cut in this manner Preferably, such a leaf is glued on the end faces of a semi-finished cap with a reduced diameter.

FIG. 4 illustrates the surface of a second type 4*b* of cork leaf cut according to the plane B, perpendicularly to the lenticels. Pores 6 resulting from cutting lenticels 5 are visible at the surface of the cork leaf. Preferably, such a leaf is glued on the lateral face of a semi-finished cap with a reduced diameter. In a particular embodiment, such a leaf is also glued on the end faces of the semi-finished cap with a reduced diameter. Such an embodiment has the advantage of reducing costs by cutting the cork leaves glued on the roll and the end faces in the same direction, both at the industrial process level and at the cork supply level It should be noted that the commercially-available cork parallelepiped, corresponding to the parallelepipeds bearing the reference numeral 4 in FIG. 2 generally have a width of 25 mm Such a width limits the possibilities of cutting a cork sheet to be glued on the lateral face of a semi-finished cap with a reduced diameter. Indeed, a cap generally has a length comprised between 38 mm and 54 mm for a diameter of 24 mm Such a diameter of 24 mm implies a perimeter of about 75 mm Thus, the cork sheet glued on the lateral face has a length of 75 mm for a width comprised between 38 and 54 mm, exceeding the width of a cork parallelepiped. Hence, such sheets should be cut perpendicularly to the width of the parallelepiped and perpendicularly to the lenticels.

The cork leaves cut in this manner have an appearance similar to the appearance observed in a cap tubed in a cork parallelepiped, so as to reinforce the visually quite similar aspect of the obtained caps with regards to caps tubed in cork.

During a second step 2, a cork sheet is glued on the lateral face of the semi-finished cap with a reduced diameter obtained in the previous step. Gluing the cork sheet is carried out edge-to-edge so that the thickness of the manufactured cap is equal to the diameter of a semi-finished cap manufactured by conventional processes of the industry, in particular by tubing or moulding. The diameter that is generally expected is 24 mm.

During a first substep 2*a*, a binder suitable for food contact is deposited over the semi-finished cap with a reduced diameter and/or the cork sheet.

In particular, the binder may be a mono-component polyurethane binder, a bi-component polyurethane binder or a hot-melt polyurethane binder.

In a particular embodiment, crosslinking the binder is improved by wetting the sheet and/or the cap by water spraying or by water condensation in a humid or humidity-saturated atmosphere.

During a second substep 2*b*, a baking of the set formed by the semi-finished cap with a reduced diameter and the cork sheet is carried out by applying a pressure normal to the glued sheet by means of a mould, possibly preheated to the baking temperature. Finally, a grinding and trimming is carried out, during a third substep 2*c* to adapt the dimensions of the glued cork sheet to the dimensions of the cap. This step is optional and depends on the result obtained upon completion of the second substep 2*b*.

During a third step 3, a cork sheet is glued on each end face of the semi-finished cap with a reduced diameter. To do so, steps similar to the substeps 2*a* to 2*c* are carried out. During a first substep 3*a*, a binder suitable for food contact is deposited over the semi-finished cap with a reduced diameter and/or the cork sheets, possibly completed with moistening the cork sheet and/or the cap. Afterwards, the cork sheets are applied on the semi-finished cap with a reduced diameter.

During a second substep 3*b*, a baking of the set formed by the semi-finished cap with a reduced diameter and the cork sheets is carried out by applying a pressure normal to the glued sheets by means of a mould, possibly preheated to the baking temperature. Finally, just like the third substep 2*c*, a grinding and a trimming are carried out, to adapt the dimensions of the glued cork sheets to the dimensions of the cap, when this turns out to be necessary.

It should be understood that the two steps 2 and 3 are interchangeable. It should also be understood that the baking substeps could be carried out in other conditions allowing maintaining a uniform heat, in particular by means of a heating tunnel oven.

It also arises that the semi-finished cap with a reduced diameter forms the core of the cap manufactured by the manufacturing method.

Various tests have been carried out in order to determine the temperature and duration conditions allowing gluing the cork sheets while preserving the mechanical properties of the cap.

During the tests, the maximum temperature has been determined as being equal to 150° C., at which temperature cork burns. A temperature comprised between and 150° C., preferably between 90° C. and 115° C., or preferably between 100° C. and 110° C. has been determined as satisfactory.

In some embodiments of agglomerated or micro-agglomerated caps, heat-expandable microspheres are added to the polyurethane binder. The maximum temperature is then equal to 110° C., beyond which temperature the caps are damaged by the expansion of the microspheres.

Several tests have been carried out to determine the optimum duration of baking in order to obtain a good cross-linking of the binder.

As regards the polyurethane binder, a 1 h time period allows obtaining good polymerisation. However, durations longer than 1 h30 do not result in any improvement of cross-linking, so that they are rather detrimental to the manufacturing method by causing a reduction in the productivity associated with the manufacturing method.

Thus, baking at a temperature comprised between 100° C. and 110° C. for a duration comprised between 1 h and 1 h30 has been determined as leading a satisfactory gluing of the cork sheet on the semi-finished cap with a polyurethane binder. Other temperatures and other durations may be necessary for other binders.

This baking is carried out by disposing the caps glued with a cork sheet in a mould allowing exerting a force on the sheet to be glued. To glue a cork sheet on an end face of the semi-finished cap with a reduced diameter, a cylindrical mould with a hinge, with a piston or with a screw is used so as to apply a pressure according to an axial direction of the cap. To glue a cork sheet on the lateral face, a cylindrical mould with a hinge and latches or a bolted one is used so as to apply a pressure on the cap radially.

It is possible to reduce the baking duration by preheating the moulds allowing applying a force normal to the cork sheets. The Applicant has then noticed that the baking duration is reduced to 10 min for a baking temperature of 150° C., to 40 min for a baking temperature of 100° C., and to 1 h for a baking temperature of 80° C.

Crosslinking of the binder has been described in connection with baking. Nevertheless, it is possible to use other heating means, in particular a heating tunnel oven, provided with a conveyor belt and allowing transiting the moulds while heating them. The running speed is then correlated with the length of the tunnel so as to obtain the above-described heating duration.

The Applicant has taken care of carrying out a preliminary testing campaign on thirty caps manufactured according to the manufacturing method of the invention in order to verify whether the caps obtained with the present manufacturing method offer similar characteristics as the caps on which they are based. In other words, it has been verified that the glued cork sheets do not degrade the performances of the cap in particular for bottling or decapping the bottle. Thus, the object of testing campaign has concerned the measurement of soaking, of the elastic return and of the extraction force. FIGS. 5 to 7 illustrate the results of these tests and their comparison with reference caps.

The results of the caps according to the invention are represented by round-shaped symbols whereas the results of the reference caps are represented by triangle-shaped symbols. Similarly, the tendency associated with the caps according to the invention is represented in dotted lines, whereas the tendency associated with the reference caps is represented in dashed lines.

Soaking of a cap characterises its water absorption in particular temperature and pressure conditions. In general, soaking of a cap is measured as a function of pressure, so as to determine its behaviour after bottling. Indeed, during bottling, air present in the bottle between the liquid and the bottle is compressed, at pressures that could reach a few tens bars. Such pressures could contribute to a loss of sealing of the caps.

In this case, the soaking measurement allows verifying that the impregnation of the cap prior to gluing of the cork sheet does not result in deterioration upon baking. Soaking of the caps has been estimated following a measurement of the mass of caps completely immersed in water at 100° C. for 15 min. This temperature allows revealing the behaviour of the caps in an accelerated manner in extreme conditions. Soaking is then determined as the ratio of the mass difference before immersion and after immersion to the mass before immersion.

FIG. 5 illustrates the results obtained for the caps according to the invention and for reference caps having a structure similar to that of the semi-finished caps in the manufacturing process according to the invention.

Thus, soaking the caps according to the invention is similar in order of magnitude and in deviation to that of the reference caps. Thus, soaking is comprised between 3 and 6% mass soaking is substantially lower than the compliance limit of 11%.

Afterwards, the elastic return has been measured. The elastic return is one of the mechanical properties of a cap and allows quantifying the force generated in reaction by the cap on the wall of the neck of the bottle. The elastic return is measured automatically with the “Multitest 10i” machine from the company Mecmesin.

During these measurements, the cap undergoes a compression until reaching a diameter comprised between 15 mm and 16 mm, which corresponds to the diameter of the jaws of a capper. The compression is obtained using a piston which moves at the speed of 10 mm/min. The force (in Newton) necessary to perform this compression is measured. The compression value is considered at the cylindrical surface of the cap. This should be comprised between 15 and 60 $N/cm^2$ and preferably between 25 and 60 $N/cm^2$ depending on the diameters of the caps.

Afterwards, the trays will release the pressure and be positioned at a distance of 21 millimetres from each other, called return distance. Within 180 seconds, the pressure that the cap exerts on the trays is increased. This pressure corresponds to the elastic return force (also in Newton). For the interpretation of the results, these forces will be calculated with respect to the surface of each cap, and therefore expressed in Newton per square centimetre.

FIG. 6 illustrates the results obtained for the caps according to the invention and for the reference caps.

The elastic return of the caps according to the invention is substantially lower, at a constant volumetric mass compared to that of the reference caps, while remaining higher than the limit of 3.2 $N/cm^2$ of the standard.

It should be noted that during these tests, no peeling of the glued cork sheet has been noticed.

Afterwards, the extraction forces allowing quantifying the force necessary to extract the cap off the neck of the bottle have been measured. They are measured as follows. First, caps to be tested are inserted into bottle necks. After 2 hours of rest in the necks, the caps are extracted using a corkscrew connected to a system for measuring the force necessary to the extraction of the cap off the neck of the bottle, such as the machine “Multitest 2.5-d” from the company Mecmesin. The extraction force value should be comprised between 100 and 600 N preferably between 200 and 500 N depending on the diameters of the caps.

FIG. 7 illustrates the results obtained for the caps according to the invention and for the reference caps.

Thus, the extraction force of the caps according to the invention is similar in terms of order of magnitude to that of the reference caps, while having a deviation that is higher yet close to that of the reference caps.

FIG. 8 illustrates the main portions of the cap according to the invention.

A cap according to the invention comprises at its centre a semi-finished cap with a reduced diameter having a reduced length, bearing the reference numeral 10. It comprises two end faces 10*a* and a lateral face 10*b*.

A cork sheet 20*a* is glued on each end face 10*a* of the semi-finished cap with a reduced diameter in order to form the lids of the cap according to the invention.

A cork sheet 20*b* is glued on the lateral face 10*b* of the semi-finished cap with a reduced diameter in order to form the roll of the cap according to the invention.

The semi-finished cap with a reduced diameter is a cap made of crushed cork glued under pressure with a polyurethane binder. The patent application FR2672002 in the name of the Applicant illustrates such a cap. Thus, the semi-finished cap with a reduced diameter forms the core of the cap according to the invention.

The invention claimed is:

1. A method for manufacturing a cap for plugging a bottle comprising two lids and a roll so as to be able to be forcibly inserted into the neck of the bottle, comprising the following steps:

- preparing a semi-finished cap with a reduced diameter from a cap made of crushed cork glued under pressure with a polyurethane binder, having a diameter uniformly reduced by a thickness equal to twice a predetermined thickness, the semi-finished cap with a reduced diameter comprising a lateral face and two end faces,
- cutting cork sheets (20*a*, 20*b*) to be glued on the end faces (10*a*) and on the lateral face (10*b*) of a semi-finished cap with a reduced diameter,
- gluing one of said cork sheets on the lateral face (10*b*) of a semi-finished cap with a reduced diameter by depositing a binder suitable for food contact, followed by baking, and
- gluing one of said cork sheets on each end face (10*a*) of the semi-finished cap with a reduced diameter by depositing a binder suitable for food contact, followed by baking, the predetermined thickness being equal to the thickness of the cork sheet glued on the lateral face of the semi-finished cap.

2. The manufacturing method according to claim 1, wherein the cork sheets glued on the lateral face of the cap are cut in cork according to a direction perpendicular to the lenticels.

3. The manufacturing method according to claim 1, wherein the cork sheets glued on the end faces of the cap are cut in cork according to a direction parallel or perpendicular to the lenticels.

4. The manufacturing method claim 1, wherein the cork sheets are treated so as to have a trichloroanisole level lower than 0.3 ng/l, preferably by a supercritical carbon dioxide treatment.

5. The manufacturing method according to claim 1, wherein the semi-finished cap with a reduced diameter is ground and/or trimmed after gluing a cork sheet to adapt the dimensions of the glued cork sheet to the dimensions of a semi-finished cap having undergone no diameter reduction.

6. The manufacturing method according to claim 1, wherein the binder is a mono-component polyurethane, a bi-component polyurethane or a hot-melt polyurethane.

7. The manufacturing method according to claim 1, wherein water is applied before, during, or after the application of binder in order to accelerate cross-linking of the binder.

8. The manufacturing method according to claim 1, wherein the baking is carried out at a temperature comprised between 80° C. and 150° C. for a duration comprised between 10 min and 1 h30 for a polyurethane binder.

9. The manufacturing method according to claim 1, wherein the baking is carried out in an autoclave or a tunnel oven.

10. The manufacturing method according to claim 1, wherein the semi-finished cap with a reduced diameter with a glued cork sheet is disposed in a mould allowing applying a pressure according to a direction normal to the surface of the cork sheet, the mould being preheated to the baking temperature.

11. The manufacturing method according to claim 1, wherein, to prepare a reduced semi-finished cap, a semi-finished cap is machined so as to uniformly reduce its diameter by a thickness equal to twice the predetermined thickness.

12. The manufacturing method according to claim 1, wherein, to prepare a semi-finished cap with a reduced diameter, a blank cap with a reduced diameter is formed in a mould with a diameter uniformly reduced by a thickness equal to twice the predetermined thickness corresponding to the diameter of a semi-finished cap with a reduced diameter, then the blank cap with a reduced diameter is machined so as to obtain a semi-finished cap with a reduced diameter.

13. The manufacturing method according to claim 1, wherein a cork sheet glued on the lateral face has a thickness comprised between 0.3 mm and 1 mm.

14. The manufacturing method according to claim 1, wherein a cork sheet glued on an end face has a thickness comprised between 0.3 mm and 2 mm.

* * * * *